United States Patent
Iyer et al.

(10) Patent No.: US 8,219,472 B2
(45) Date of Patent: Jul. 10, 2012

(54) VALUATION OF DERIVATIVE PRODUCTS

(75) Inventors: Suneel Iyer, Naperville, IL (US); Keith Anguish, Homer Glen, IL (US); Moody Hadi, Chicago, IL (US); Ketan Patel, Hanover Park, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 591 days.

(21) Appl. No.: 12/260,709

(22) Filed: Oct. 29, 2008

(65) Prior Publication Data

US 2010/0106633 A1 Apr. 29, 2010

(51) Int. Cl.
*G06Q 40/00* (2012.01)
(52) U.S. Cl. .............................. 705/35; 705/38
(58) Field of Classification Search ............ 705/35
See application file for complete search history.

(56) References Cited

U.S. PATENT DOCUMENTS

2007/0239589 A1* 10/2007 Wilson et al. .................. 705/37

OTHER PUBLICATIONS

Mian Asif Said Business Recorder Tutorial on futures May 5, 2005 journal code WBRE.*
Fabozzi, Frank, J., Fixed Income Analysis, Second Edition, copyright 2004, 2007, pp. 377-382 and 400-404, published by John Wiley & Sons, Inc., Hoboken, New Jersey.
Ron, Uri, A Practical Guide to Swap Curve Construction, Bank of Canada Working paper 2000-17, Aug. 2000, 32 pages.
Kumar, S.S.S., Financial Derivatives, Eastern Economy Edition, copyright 2007, PHI Learning Private Limited, New Delhi, pp. 154-158.

* cited by examiner

*Primary Examiner* — Shahid Merchant
*Assistant Examiner* — John Anderson
(74) *Attorney, Agent, or Firm* — Banner & Whitcoff Ltd.

(57) ABSTRACT

Disclosed are a method, apparatus, and computer-readable medium for determining the value of a derivative product over nonconsecutive periods. The derivative product may be an interest rate swap product, which, when exchanged traded, normally is valued on a mark-to-market basis over consecutive periods. The product may be valued using swap value factors and settlement values according to the methodology disclosed herein.

22 Claims, 4 Drawing Sheets

Fig. 2

| | | | | This Calc | Running Total |
|---|---|---|---|---|---|
| CVP, 2008-09-02: | (4.50000 - 4.00000) * 0.01 * | 48204.7406268 / | 100,000 * | -4,000,000 = | -9,640.95 | -9,640.95 |
| CVP, 2008-09-01: | (4.00000 - 4.00000) * 0.01 * | 48193.9100207 / | 100,000 * | -4,000,000 = | 0.00 | -9,640.95 |
| CVP, 2008-08-29: | (4.00000 - 4.00000) * 0.01 * | 48174.4434361 / | 100,000 * | -4,000,000 = | 0.00 | -9,640.95 |
| CVP, 2008-08-28: | (4.00000 - 4.00000) * 0.01 * | 48167.3863081 / | 100,000 * | -4,000,000 = | 0.00 | -9,640.95 |
| CVP, 2008-08-27: | (4.00000 - 4.00000) * 0.01 * | 48158.5006597 / | 100,000 * | -4,000,000 = | 0.00 | -9,640.95 |
| CVP, 2008-08-26: | (4.00000 - 4.00000) * 0.01 * | 48151.2207034 / | 100,000 * | -4,000,000 = | 0.00 | -9,640.95 |
| CVP, 2008-08-25: | (4.00000 - 4.20000) * 0.01 * | 48137.8198969 / | 100,000 * | -4,000,000 = | 3,851.03 | -5,789.92 |
| CVP, 2008-08-22: | (4.20000 - 4.20000) * 0.01 * | 48071.2560317 / | 100,000 * | -4,000,000 = | 0.00 | -5,789.92 |
| CVP, 2008-08-21: | (4.20000 - 4.20000) * 0.01 * | 48064.9586083 / | 100,000 * | -4,000,000 = | 0.00 | -5,789.92 |
| CVP, 2008-08-20: | (4.20000 - 4.20000) * 0.01 * | 48056.5495996 / | 100,000 * | -4,000,000 = | 0.00 | -5,789.92 |
| CVA, 2008-08-19: | (4.20000 - 3.15560) * 0.01 * | 48046.7178575 / | 100,000 * | -4,000,000 = | -20,072.00 | -25,861.92 |
| CVP, 2008-08-18: | (4.20000 - 3.93400) * 0.01 * | 97695.6406836 / | 100,000 * | -4,000,000 = | -10,394.82 | -36,256.74 |
| TVC, 2008-08-15: | (3.93400 - 5.42500) * 0.01 * | 97786.5023422 / | 100,000 * | -4,000,000 = | 58,319.87 | 22,063.13 |

| Trade Date (MM/DD/YYYY) | For Value on This Date (MM/DD/YYYY) | Product (CME Group Clearing Code) | Product Period Code (YYYYMM) | Notional Value of The Trade (Buy=Positive, Sell=Negative) | Onset Trade Price | Offset Trade Price (If Applicable) | Trade Mark-To-Market or P&L | |
|---|---|---|---|---|---|---|---|---|
| 08/15/2008 | 08/15/2008 | EUR6E | 200908 | -4,000,000.00 | 4.66000 | 4.50000 | 6,258.34 | Get New History File |
| 08/15/2008 | 09/11/2008 | EUR6E | 200908 | 3,700,000.00 | 5.70000 | 4.50000 | 44,669.68 | Show Log Row 16 |
| 09/11/2008 | 09/11/2008 | USD3L | 200908 | 10,000,000.00 | 5.70000 | 5.44400 | 54,700.16 | Show Log Row 17 |
| 09/11/2008 | 09/11/2008 | EUR6E | 200908 | 1,000,000.00 | 5.42500 | 4.50000 | -9,383.77 | Show Log Row 18 |
| 08/15/2008 | 09/12/2008 | EUR6E | 200908 | -4,000,000.00 | 5.55500 | 5.55500 | 7,519.71 | Show Log Row 19 |
| 08/15/2008 | 09/10/2008 | EUR6E | 200908 | 100,000,000.00 | 4.99500 | 4.50000 | -130,785.35 | Show Log Row 20 |
| 08/15/2008 | 09/02/2008 | EUR6E | 200908 | -4,000,000.00 | 5.42500 | 4.50000 | 22,053.13 | Show Log Row 21 |
| 08/15/2008 | 09/11/2008 | EUR6E | 200908 | 0.00 | 0.00000 | 0.00000 | 0.00 | Show Log Row 22 |
| 08/15/2008 | 09/11/2008 | EUR6E | 200908 | 0.00 | 0.00000 | 0.00000 | 0.00 | Show Log Row 23 |
| 08/15/2008 | 09/11/2008 | EUR6E | 200908 | 0.00 | 0.00000 | 0.00000 | 0.00 | Show Log Row 24 |
| 08/15/2008 | 09/11/2008 | EUR6E | 200908 | 0.00 | 0.00000 | 0.00000 | 0.00 | Show Log Row 25 |
| 08/15/2008 | 09/11/2008 | EUR6E | 200908 | 0.00 | 0.00000 | 0.00000 | 0.00 | Show Log Row 26 |
| 08/15/2008 | 09/11/2008 | EUR6E | 200908 | 0.00 | 0.00000 | 0.00000 | 0.00 | Show Log Row 27 |
| 08/15/2008 | 09/11/2008 | EUR6E | 200908 | 0.00 | 0.00000 | 0.00000 | 0.00 | Show Log Row 28 |
| 08/15/2008 | 09/11/2008 | EUR6E | 200908 | 0.00 | 0.00000 | 0.00000 | 0.00 | Show Log Row 29 |
| 08/15/2008 | 09/11/2008 | EUR6E | 200908 | 0.00 | 0.00000 | 0.00000 | 0.00 | Show Log Row 30 |
| 08/15/2008 | 09/11/2008 | EUR6E | 200908 | 0.00 | 0.00000 | 0.00000 | 0.00 | Show Log Row 31 |
| 08/15/2008 | 09/11/2008 | EUR6E | 200908 | 0.00 | 0.00000 | 0.00000 | 0.00 | Show Log Row 32 |
| 08/15/2008 | 09/11/2008 | EUR6E | 200908 | 0.00 | 0.00000 | 0.00000 | 0.00 | Show Log Row 33 |
| 08/15/2008 | 09/11/2008 | EUR6E | 200908 | 0.00 | 0.00000 | 0.00000 | 0.00 | Show Log Row 34 |
| 08/15/2008 | 09/11/2008 | EUR6E | 200908 | 0.00 | 0.00000 | 0.00000 | 0.00 | Show Log Row 35 |

-94,297.46 <--Total Variation and/or P&L

401 — Trade Date
402 — For Value on This Date
403 — Product
404 — Product Period Code
405 — Notional Value of The Trade
406 — Onset Trade Price
407 — Offset Trade Price
408 — Trade Mark-To-Market or P&L
409 — Get New History File
410 — Show Log Row

VALUATION OF DERIVATIVE PRODUCTS

FIELD OF INVENTION

The invention relates to trading and clearing of financial instruments. In particular, aspects of the invention relate to processing and clearing interest rate swaps.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the contract.

An interest rate swap (IRS) is an example of a type of OTC product where the parties agree to exchange streams of future interest payments based on a specified principal or notional amount. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The vanilla swap includes an exchange of interest streams where one stream is based on a floating rate and the other interest stream is based on a fixed rate. In a vanilla swap, one party makes periodic interest payments to the other based on a variable interest rate. The variable rate may be linked to a periodically known or agreed upon rate for the term of the swap such as the London Interbank Offered Rate (LIBOR).

In return for the stream of payments based on the variable rate, the other party may receive periodic interest payments based on a fixed rate. The payments are calculated over the notional amount. The first rate is called variable, because it is reset at the beginning of each interest calculation period to the then current reference rate, such as LIBOR published rate. The parties to an IRS swap generally utilize these exchanges to limit, or manage, exposure to fluctuations in interest rates, or to obtain lower interest rates than would otherwise be unobtainable.

Usually, at least one of the legs to a swap has a variable rate. The variable rate may be based on any agreed upon factors such as a reference rate, the total return of a swap, an economic statistic, etc. Other examples of swaps include total return swaps, and Equity Swaps.

A total return swap (also known as total rate of return swap, or TRORS) is a swap where one party receives interest payments based on an underlying asset (plus any capital gains/losses) over the payment period, while the other receives a specified fixed or floating cash flow. The total return is the capital gain or loss, plus any interest or dividend payments. The specified fixed or floating cash flow is typically unrelated to the credit worthiness of the reference asset. The underlying asset may be any asset, index, or basket of assets. The parties gain exposure to the return of the underlying asset, without having to actually hold the asset. That is, one party gains the economic benefit of owning an asset without having the asset on its balance sheet, while the other (which does retain that asset on its balance sheet) has protection against a potential decline in its value. An equity swap is a variation of a total return swap. The underlying asset in an equity swap may be a stock, a basket of stocks, or a stock index.

The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment.

Currently, financial institutions such as banks trade interest rate payments and/or IRSs OTC. Steams of future payments must be valued to determine a current market price. The market value of a swap is the sum of the difference between the net present value (NPV) of the future fixed cash flows and the floating rate.

The Chicago Mercantile Exchange clears interest rate swap products. Generally, such swap products are settled on a mark-to-market basis (this can be over two periods per trading day). In such cases, a settlement valuation is made at the time of settlement. The settlement valuation may be positive (representing a gain to the holder) or negative (representing a loss to the holder). The gain or loss is cleared by the exchange at the time of settlement.

In some cases, it would be desirable to provide a valuation of a derivative product, such as a leg of an interest rate swap, at a time $T_n$ as compared to a time $T_1$, where $T_n$ and $T_1$ are sequential but not consecutive trading periods. This would be desirable, for instance, in accounting for irregularities in the entry or execution of a trade. Also, positions may be transferred from one party to another, and, given the non-linear nature of the underlying profit and loss calculations in a swap valuation calculation, it would be desirable in these cases to provide a way to verify the value of the transaction.

BRIEF DESCRIPTION OF THE DRAWINGS

The present invention may take physical form in certain parts and steps, described in detail in the following description and illustrated in the accompanying drawings that form a part hereof, wherein:

FIG. 2 is a table that illustrates the calculation of a valuation of a position over sequential nonconsecutive periods.

FIG. 4 is a representation of a screenshot of an operating computer program in which the valuation of a derivative product may be determined based on user inputs.

DETAILED DESCRIPTION

Figure 1:
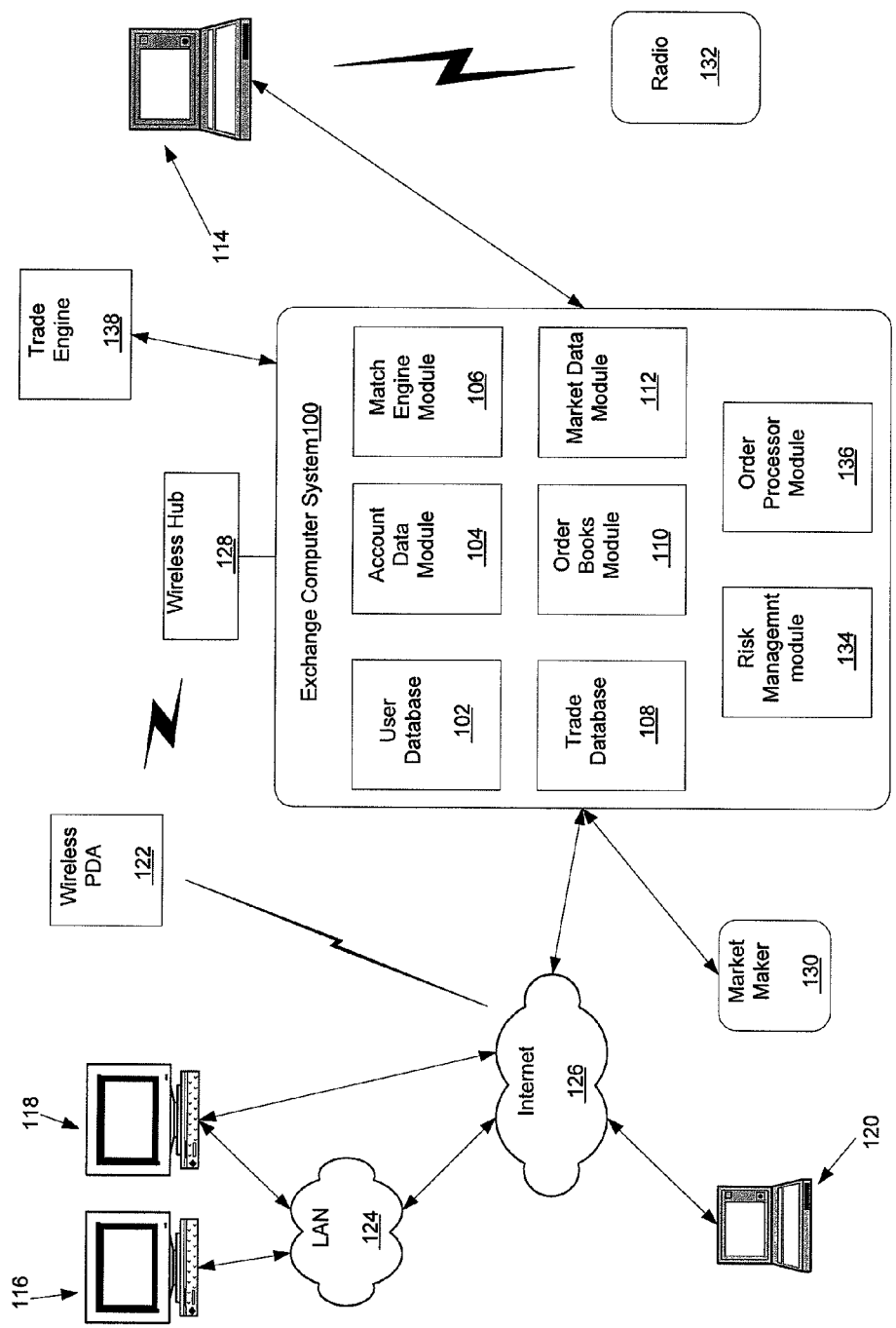
FIG. 1 illustrates an exemplary trading network environment for implementing trading systems and methods.

With reference to FIG. 1, an exchange computer system 100 receives orders and transmits market data related to orders and trades to users. Exchange computer system 100 may be implemented with one or more mainframe, servers, gateways, desktop, handheld and/or other computers. In one embodiment, a computer device uses a 64-bit (or more) processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card, such as an Ethernet card, or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In accordance with various aspects of the invention, a clearinghouse may act as a guarantor of the agreement for the derivative. At least one benefit of an exchange traded derivative, as opposed to the OTC type, is that the derivative is cleared and guaranteed by the clearinghouse. This may promise more interesting capital efficiencies for institutions that may cross-margin one derivative against another derivative. Additionally, the central clearinghouse typically allows the holder of a position to trade into or out of a position easily and in a standardized way.

In an aspect of the invention, upon execution of an IRS between parties, a clearing process may be initiated to process the cash flows resulting from the transaction. The clearing process may be initiated by, for example, the processing unit of a module of the computer system 100. Following the initial cash flow processing, the clearing process maintains the IRS swaps, now-guaranteed by the central clearing party, for its lifespan, e.g., 10 years. As the IRS positions for all parties may be standardized, the floating rate reset and payment processing may be simpler and easier to manage because there is only one floating rate reset and cash flow calendar per currency. The International Swaps and Derivatives Association (ISDA) day-count conventions, affect of holidays and other cash flow and reset related parameters may also be pre-selected.

The invention is contemplated to be useful in connection with any derivative, by which is contemplated any instrument whose value depends on an underlying value and including without limitation such derivatives as interest rate swaps, credit default or other swaps, options, forwards, and futures. Many such derivatives are exchange-traded and are valued on a mark-to-market basis. The Chicago Mercantile Exchange, the assignee of the present application, presently operates an exchange for interest rate swaps, and the invention is particularly contemplated to be useful in connection with such swaps. Interest rates swaps are described in more detail in copending application Ser. No. 11/950,117, entitled "Factorization of Interest Rate Swap Variation," published as U.S. Application Publication No. 2008-0249958 A1, and in application Ser. No. 12/021,568, entitled "Standardization and Management of Over-the-Counter Financial Instruments," published as U.S. Application Publication No. 2008-0183615 A1, both of which applications are hereby incorporated by reference in their entireties.

In particular, the swap exchange technology described in the foregoing applications can employ a variable tick rate. The tick rate is determined using a value known as the swap value factor (SVF), which is calculated to simplify the mark-to-market (MTM) variation calculation of a cleared interest rate swap. The SVF may include the swap's applicable discount factors and associated daycount fractions into a single factor, and may be considered as the sum of coupon value factors. For a given coupon, a coupon value factor may be calculated as the product of the daycount fraction associated with that coupon and the discount factor used to present value that coupon's cash flow. The sum of all such coupon value factors across a given swap contract's coupons equals that swap contract's swap value factor. The SVF may be a function of interest rates derived from yield curves. Generally, the swap value factor is used to calculate a mark-to-market value over two consecutive market periods (which may be, for instance, sequential days or which may include multiple mark-to-market periods per trading day). The mark-to-market value is calculated as:

$MTM = [(\text{Settlement rate}_T) - (\text{Settlement rate}_{T-t})]$
$* SVF_T * \text{SignedNotionalTradeValue}$ This value is defined in currency units (e.g., dollars or Euros) and often is calculated as value per 100,000 nominal currency units (e.g., per $100,000). The MTM value is calculated at time "T" relative to time "T-t." In a mark-to-market exchange, "t" represents one settlement period, and thus generally time "T-t" is the immediately preceding settlement period. Positive notional amounts represent a buy, and negative notional amounts represent a sell.

For example, a clearinghouse or other entity may wish to calculate the MTM variation of a six month USD swap (i.e. a swap with two quarterly coupons—swap matures in September 2010) that commences on Mar. 19, 2010 with a notional swap value of $1,000,000. For this exemplary scenario, the current date is assumed to be Mar. 16, 2010 with an IMM start date of Mar. 19, 2010. The MTM variation of the swap maturing in September 2010 may be calculated as of the end of the day settlement on Mar. 16, 2010 relative to Mar. 15, 2010, end of day settlement. In this exemplary scenario, the Mar. 15, 2010 settlement rate for the swap maturing in September 2010 is 5.38% and the Mar. 16, 2010 settlement rate is 5.40%. The calculated number of days between the Mar. 19, 2010 (the next IMM date) start date and June 2010 coupon is 91 days. The calculated number of days between the June 2010 coupon and the September 2010 coupon is 92 days. The discount factors used to discount the September 2010 swap's coupon back to Mar. 16, 2010 along with the coupon daycounts are illustrated in the following table.

| Coupon | Days between coupons | Mar. 16, 2010 Discount Factor |
|---|---|---|
| June 2010 | 91 | 0.9891 |
| September 2010 | 92 | 0.9775 |

The MTM of an interest rate swap on Mar. 16, 2010 (calculated at time "T" relative to time "T-t"), using a SVF at time "T" 204 may be calculated by applying the equation:

$MTM = [(\text{Settlement Rate on Mar. 16, 2010}) - (\text{Settlement Rate on Mar. 15, 2010})] * (\text{Swap Value Factor on Mar. 16, 2010}) * \text{notional amount}.$ It is noted that the swap value factor on Mar. 15, 2010, the start of the settlement period, is not used in this calculation.

The swap value factor may itself be calculated via any suitable methodology. Generally, and as heretofore described in application Ser. Nos. 11/950,117 and 12/021,568, the swap value factor may be expressed as:

$$\sum_{i=1}^{n} (d_i - d_{i-1})/360 \times sf_i$$

where $sf_i$ is the discount factor associated with the $i^{th}$ coupon, per the equation above. Further details concerning the calculation and use of swap value factors can be found in the heretofore identified applications.

The swap value factor ordinarily is used to calculate mark-to-market settlements from settlement values. In practice, the settlement values may be subjected to an adjustment on the "roll" date of the swap, which occurs quarterly for dollar-denominated interest rate swaps and semiannually for Euro-denominated swaps. When this adjustment is made, an adjusted start of day price is used to value positions that have remained open during the roll.

It is contemplated that on occasion it may be desirable to calculate the value of a swap contract, or one leg of the swap contract, over a period that does not represent a consecutive mark-to-market period. This may be desirable, for instance, in accounting for irregularities in the formation of a trade, or for purposes of verifying the valuation of a trade. Consecutive swap value factors may be used for this purpose. Generally, this valuation represents an aggregation of a series of profit/loss (P&L) mark-to-market value calculations, each of the P&L values being derived with a swap value factor.

For instance, assuming that it is desired to calculate the valuation of a swap product at time n ($V_{(n)}$), this may be calculated in accordance with the following equation:

$$V_{(n)} = K * \left[ ((SV_1 - OV) * SVF_1) + \sum_{i=2}^{n} (SV_i - SV_{i-1}) * SVF_i \right]$$

wherein K represents the notional value of the derivative, $SV_2$ through $SV_{n-1}$ represent the settlement values at the end of the relevant period and wherein one or more $SV_i$ values may be adjusted in a sequential calculation, wherein OV represents the initial trade price (also known as the onset value), wherein $SV_n$ represents the end of period settlement values if not offset before the end of period n and wherein $SV_n$ represents the offset trade price if offset before the end of period n, and wherein $SVF_1$-$SVF_n$ represent swap value factors over the periods. As discussed hereinbelow with reference to FIG. 2, the swap value factor in this instance is expressed per 100,000 currency units. In most cases the calculation is made from the onset of the position to a future date; if it were desired to calculate the change in value over a period that did not include the onset date, then the settlement value at the start of the position would be deemed the initial trade price OV. In most cases this value will be rounded to the lowest currency unit (e.g., $0.01).

For instance, FIG. 2 illustrates the calculation of the value of a position for an interest rate swap with a notional value of -$4,000,000.00 (a sell trade), assuming a hypothetical trade date of Aug. 15, 2008 and an offset date of Sep. 2, 2008 with one settlement per day. As depicted at column 201, there are numerous different types of calculations that may be used, including the following:

TVC=current settlement price vs. initial trade price

OVP=offset trade price vs. prior day's settlement price (used on offset date)

CVP=current settlement price vs. prior day's settlement price (used on dates other than offset or onset dates when no adjustment needed)

OVA=offset trade price vs. adjusted start of day price (used when the offset date is a roll date or other date requiring adjustment in the start-of-day price) (not used in the table of FIG. 2)

CVA=current settlement price vs. adjusted start of day price (used for dates other than the offset date where adjustment is required in the start-of-day price).

The "price" in this instance signifies the rate of the interest rate of the swap. Thus, given a hypothetical purchase on Aug. 15, 2008 and sale on Sep. 2, 2008, a valuation may be calculated with reference to the date in column 202 and settlement values in column 203. On Aug. 15, 2008, the trade is made at a value of 5.425%, and the settlement value for the day is at 3.934%. The swap value factor for the day in question (column 204) is 97786.5023422 (or, expressed per 100,000 units, 0.0977865023422). Using a TVC calculation, this represents a mark-to-market value for the day (column 205) of $58,319.87. A similar calculation is made for Aug. 18, 2008, but in this case the daily settlement price is 4.200% and the swap value factor has changed to 97695.6406836. This represents a mark-to-market loss of $10,394.82 for the day, using a CVP calculation.

On August 19, a roll has occurred, and the start of day price is adjusted to 3.15560. Hence in this case, a CVA calculation takes place. Subsequently, through September 1, conventional CVP calculations using the current settlement price versus the prior day's price are employed. On September 2, the offset date, an OVP calculation is used with the offset settlement value of 4.5%, yielding −9,640.95. Aggregating these values (counting backwards as illustrated in the running total column 206), for the period in question, the valuation is $22,063.13. This represents the valuation of this position over the period August 15 through September 2.

Figure 3:
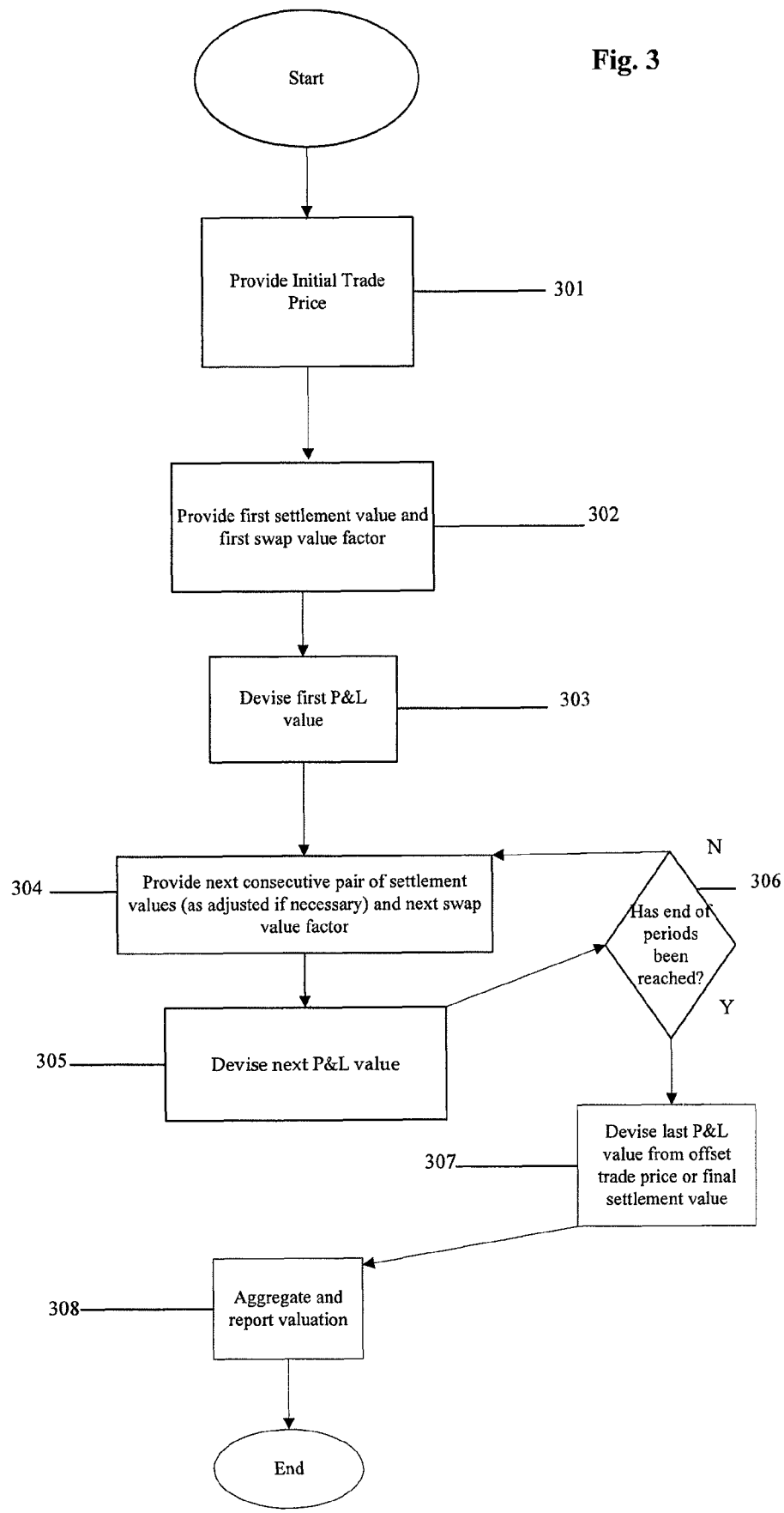
FIG. 3 is a flowchart that represents steps in a method for determining the valuation of a derivative product over nonconsecutive periods.

As heretofore indicated, the invention may be implemented via software, which software may employ the generalized methodology illustrated in FIG. 3. In this methodology, at step 301 the initial trade price (onset value) is provided, and at step 302, the first settlement value and swap value factor are provided. In step 303, the first P&L value is determined using the swap value factor equations discussed hereinabove. Continuing at step 304, the next swap value factor and consecutive pair of settlement values (adjusted if needed) are provided, and at step 305 the next P&L value is recorded.

If, at step 306, the end of the desired period has been reached, then control passes to step 307, at which the final swap value factor is used in connection with the final settlement value (or offset trade price, if different) and prior settlement value to determine the final P&L value. Finally, at step 308, these values are aggregated and reported. In practice, it is envisioned that this methodology is generalized, and other steps may be added.

As illustrated in FIG. 4, the calculations could be utilized by a computer program software product, which, in the illustrated embodiment, has a user interface 400. In this embodiment, columns 401 to 407 represent the following user inputs:
401 represents the onset trade date
402 represents the offset trade date or position valuation date
403 represents the swap product (indicated in this instance with a group clearing code), and 404 representing the period code for the product
405 represents the notional value of the trade, with a buy trade signified by a positive value and a sell trade signified by a negative value
406 and 407 represent initial trade price and offset trade price respectively.

In this embodiment, the offset trade price may be entered as a zero value, which signifies that there is no offsetting trade and the calculation of the position is based on the settlement price for that day. Using these inputs, the valuation over the period for each position (calculated using swap value factors as described herein) is indicated at column 408. These valuations may themselves be aggregated for a group of positions, as shown at the total P&L figure of −$94,297.46.

In use, the operator would enter the values in columns 401-407, and also would retrieve an updated history file using input button 409 (either before or after entering input values). The history file could be located on a local or remote server, and would be retrieved from the local or remote server upon activation of button 409. This history file contains daily settlement values and swap value factors. It is envisioned that the history file would be updated regularly by the entity maintaining the file (such as the clearing exchange). Buttons 410 could be activated by the user to display a table of the type depicted in FIG. 2, i.e., to provide the detail as the calculations used to arrive at the figure in column 408 based upon the inputs for each position.

The invention in some embodiments may be regarded as a method for performing the steps described therein. In other embodiments, the invention may be embodied as an apparatus that comprises a display, a memory unit, and a processing unit coupled to the memory unit and configured to perform the steps described herein. In other embodiments, the invention may be embodied as a tangible computer-readable medium that contains computer-executable instructions for causing a computing device to perform steps described herein.

It is thus seen that settlement values over non-consecutive periods may be determined in swap value factors. Generally these periods will be sequential; if not, the calculations described herein may be repeated over plural nonconsecutive sequential periods.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A method for determining a value of an exchange-traded interest rate swap product over sequential but nonconsecutive periods, the method comprising aggregating, by a processor, a series of calculated mark-to-market values from a start of a period at which the product is onset to an end of the period, the calculation employing swap value factors, each swap value factor being a sum of coupon value factors, the calculation being performed in accordance with the following equation:

$$V_{(n)} = K * \left[ ((SV_1 - OV) * SVF_1) + \sum_{i=2}^{n} (SV_i - SV_{i-1}) * SVF_i \right]$$

wherein K represents the notional value of the derivative, $SV_2$ through $SV_{n-1}$ represent the settlement values at the end of the relevant period and wherein one or more $SV_i$ values may be adjusted in a sequential calculation, wherein OV represents the initial trade price, wherein $SV_n$ represents the end of period settlement values if not offset before the end of period n and wherein $SV_n$ represents the offset trade price if offset before the end of period n, and wherein $SVF_1$-$SVF_n$ represent swap value factors over the periods.

2. A method according to claim 1, said interest rate swap product being a dollar-denominated product.

3. A method according to claim 1, said interest rate swap product being a Euro-denominated product.

4. A method according to claim 1, said interest rate swap product being offset at the end of the period.

5. A method comprising:
for an exchange-traded mark-to-market derivative product having a variable tick rate, determining, by a processor, a valuation for said product at a time $T_n$ relative to an earlier time $T_1$, $T_n$ and $T_1$ being nonconsecutive market periods, wherein the valuation is based on at least one pair of settlement values from consecutive market periods between time $T_1$ and $T_n$.

6. A method according to claim 5, said derivative product comprising an interest rate swap product.

7. A method according to claim 6, comprising calculating the valuation for said interest rate swap product using a swap value factor.

8. A method according to claim 7, wherein the swap value factor is a sum of coupon value factors.

9. A method according to claim 8, wherein each coupon value factor is calculated for a coupon expiration date as a product of daycount fraction and swap discount factor.

10. A method according to claim 7, comprising calculating the valuation of said swap product according to the following equation:

$$V_{(n)} = K * \left[ ((SV_1 - OV) * SVF_1) + \sum_{i=2}^{n} (SV_i - SV_{i-1}) * SVF_i \right]$$

wherein K represents the notional value of the derivative, $SV_2$ through $SV_{n-1}$ represent the settlement values at the end of the relevant period and wherein one or more $SV_i$ values may be adjusted in a sequential calculation, wherein OV represents the initial trade price, wherein $SV_n$ represents the end of period settlement values if not offset before the end of period n and wherein $SV_n$ represents the offset trade price if offset before the end of period n, and wherein $SVF_1$-$SVF_n$ represent swap value factors over the periods.

11. An apparatus comprising a display, a memory unit storing computer executable instructions, and a processing unit coupled to the memory unit and configured to process the instructions to cause the apparatus at least to perform:
for an exchange-traded mark-to-market derivative product having a variable tick rate, determining a valuation for said product at a time $T_n$ relative to an earlier time $T_1$, $T_n$ and $T_1$ being nonconsecutive market periods, wherein the valuation is based on at least one pair of settlement values from consecutive market periods between time $T_1$ and $T_n$.

12. An apparatus according to claim 11, said derivative product comprising an interest rate swap product.

13. An apparatus according to claim 12, said processor configured to calculate the valuation for said interest rate swap product using a swap value factor.

14. An apparatus according to claim 13, wherein the swap value factor is a sum of coupon value factors.

15. An apparatus according to claim 14, wherein each coupon value factor is calculated for a coupon expiration date as a product of daycount fraction and swap discount factor.

16. An apparatus according to claim 13, said processor configured to calculate the valuation of said swap product according to the following equation:

$$V_{(n)} = K * \left[ ((SV_1 - OV) * SVF_1) + \sum_{i=2}^{n} (SV_i - SV_{i-1}) * SVF_i \right]$$

wherein K represents the notional value of the derivative, $SV_2$ through $SV_{n-1}$ represent the settlement values at the end of the relevant period and wherein one or more $SV_i$ values may be adjusted in a sequential calculation, wherein OV represents the initial trade price, wherein $SV_n$ represents the end of period settlement values if not offset before the end of period n and wherein $SV_n$ represents the offset trade price if offset before the end of period n, and wherein $SVF_1$-$SVF_n$ represent swap value factors over the periods.

17. A tangible computer-readable medium containing computer-executable instructions for causing a computing device to perform steps comprising:
for an exchange-traded mark-to-market derivative product having a variable tick rate, determining a valuation for said product at a time $T_n$ relative to an earlier time $T_1$, $T_n$ and $T_1$ being nonconsecutive market periods, wherein the valuation is based on at least one pair of settlement values from consecutive market periods between time $T_1$ and $T_n$.

18. A computer-readable medium according to claim 17, said derivative product comprising an interest rate swap product.

19. A computer-readable medium according to claim 18, said instructions, when executed, cause the apparatus to calculate the valuation using a swap value factor.

20. A computer-readable medium according to claim 19, wherein the swap value factor is a sum of coupon value factors.

21. A computer-readable medium according to claim 20, wherein each coupon value factor is calculated for a coupon expiration date as a product of daycount fraction and swap discount factor.

22. A computer-readable medium according to claim 19, said instructions configured to calculate the valuation of said swap product according to the following equation:

$$V_{(n)} = K * \left[ ((SV_1 - OV) * SVF_1) + \sum_{i=2}^{n} (SV_i - SV_{i-1}) * SVF_i \right]$$

wherein K represents the notional value of the derivative, $SV_2$ through $SV_{n-1}$ represent the settlement values at the end of the relevant period and wherein one or more $SV_i$ values may be adjusted in a sequential calculation, wherein OV represents the initial trade price, wherein $SV_n$ represents the end of period settlement values if not offset before the end of period n and wherein $SV_n$ represents the offset trade price if offset before the end of period n, and wherein $SVF_1$-$SVF_n$ represent swap value factors over the periods.

* * * * *